United States Patent [19]

Bennett

[11] Patent Number: 5,404,464
[45] Date of Patent: Apr. 4, 1995

[54] BUS CONTROL SYSTEM AND METHOD THAT SELECTIVELY GENERATE AN EARLY ADDRESS STROBE

[75] Inventor: Brian R. Bennett, Laguna Niguel, Calif.

[73] Assignee: AST Research, Inc., Irvine, Calif.

[21] Appl. No.: 16,726

[22] Filed: Feb. 11, 1993

[51] Int. Cl.6 ............... G06F 12/00; G06F 13/14
[52] U.S. Cl. .................... 395/325; 395/425;
364/228.3; 364/240; 364/240.1; 364/240.5;
364/243; 364/246; 364/246.4; 364/247;
364/DIG. 1
[58] Field of Search ............... 395/400, 425, 325, 725,
395/200; 365/230.01, 230.03, 230.04, 230.05,
230.06

[56] References Cited

U.S. PATENT DOCUMENTS

| | | | |
|---|---|---|---|
| 4,051,551 | 9/1977 | Lawrie et al. | 395/425 |
| 4,371,929 | 2/1983 | Brann et al. | 364/200 |
| 4,383,297 | 5/1983 | Wheatley et al. | 364/200 |
| 4,594,657 | 6/1986 | Byrns | 364/200 |
| 4,669,056 | 5/1987 | Waldecker et al. | 364/200 |
| 4,796,232 | 1/1989 | House | 365/189 |
| 4,797,815 | 1/1989 | Moore | 364/200 |
| 4,916,692 | 4/1990 | Clarke et al. | 370/85.1 |
| 4,969,088 | 11/1990 | McAuliffe et al. | 395/325 |
| 5,043,883 | 8/1991 | Inouchi et al. | 364/200 |
| 5,140,682 | 8/1992 | Okura et al. | 395/425 |
| 5,197,140 | 3/1993 | Balmer | 395/400 |
| 5,214,769 | 5/1993 | Uchida et al. | 395/425 |
| 5,226,134 | 7/1993 | Alderiguia et al. | 395/425 |
| 5,261,064 | 11/1993 | Wyland | 395/400 |

OTHER PUBLICATIONS

C-bus II Specification, Corallary, Inc., Revision 1.19a, Apr. 13, 1993.

Primary Examiner—Gopal C. Ray
Attorney, Agent, or Firm—Knobbe, Martens, Olson & Bear

[57] ABSTRACT

An improved bus architecture system for use in a multi-processor computer system has a shared address bus and a shared data bus, and has at least two separate memory modules. The system reduces the bus latency time by allowing sequential address requests to different memory modules to begin before previous cycles are terminated. Preferably, the physical memory is mapped onto several separate memory modules which will increase the probability that concurrent address requests from different processors on the common bus are for different memory modules. The processor address determines which memory module contains the data for a new request. If the memory module addressed by the new request differs from the memory module addressed by the current request, the bus controller may issue an early address request for the new data. While the early address request for the new request is being processed, the current bus cycle for the data located in the first memory module is completed on the shared data bus. Thus, the bus latency in a tightly-coupled multi-processor system can be significantly reduced using the improved bus architecture.

7 Claims, 8 Drawing Sheets

BUS CONTROL SYSTEM AND METHOD THAT SELECTIVELY GENERATE AN EARLY ADDRESS STROBE

BACKGROUND OF THE INVENTION

1. Field of the Invention

The present invention relates to an improved bus architecture which decreases the bus access time in a tightly coupled multi-processor system.

2. Description of the Related Art

In a tightly coupled multi-processor system, all of the processors in the system share a common address and data bus, as well as a common system memory. When a multi-processor system employs a single common bus for address and data transfers, the bus must be restricted to one transfer at a time. Therefore, when one processor is communicating with the memory, all other processors are either busy with their own internal operations or must be idle, waiting for the bus to become free. The time that the processor spends waiting idle for the bus to become available is referred to as bus latency.

In a conventional multi-processor, common-bus architecture, the address bus is needed only for a short time while the addressed memory unit decodes the memory request. The correct memory board will then latch the address from the address bus. The address bus remains idle for the remainder of the data transfer. The data transfer time may be quite long depending upon the type of memory storage unit. Once the memory delivers the data to the data bus, and the requesting device releases the system bus, the address and data busses are released and become available to the other processors.

During the period that one processor is using the bus, the other processor must wait for the data bus to become available in order to initiate a data transfer. As the number of processors increases, the number of bus accesses increases, and, therefore, the bus latency increases. Inherent in typical bus access cycles are periods during which one processor holds the bus while it waits for a reply signal. During this time, the processor is not using the address bus. Rather, it holds the bus to prevent other processors from accessing the bus until it receives a reply. The time that the bus is held but not active while waiting for an acknowledge signal is a principal cause of bus latency in multi-processor systems.

Some multi-processor systems use a split transaction bus in order to cut down on the time that the bus is being held. In the split transaction bus, the address and data bus operate independently, thus allowing multiple requests to be outstanding. The requestor of the bus activates an address request to the address bus. Once the addressed device (e.g., memory module) latches the address and provides an acknowledgement, the requestor releases the address bus for other address requests. When the data is available from the addressed device, the device acquires the bus and delivers the data to the requestor. The address bus is therefore available for other memory requests while the memory system delivers the requested data to the requestor. The split transaction bus method reduces bus latency; however, the complexity of the system is increased dramatically. The memory boards for a split transaction system require the ability to queue and possibly sort requests, and must be provided with bus controller capabilities. The queue capability requires additional memory space to store and queue the outstanding requests and additional control logic to implement the bus controller.

In addition, depending on the system protocol, the amount of time that is saved between bus requests may decrease with increased bus transaction time. The memory access cycle time in a split transaction bus is typically longer then in a single bus system because each cycle includes steps to perform the queuing and bus control functions. If the queuing and bus control steps take longer than the time saved between transaction, the benefits of the "time saving" split transaction bus can quickly diminish. Without the return of a substantial decrease in the overall system memory access time, the increase in the complexity of the system that is required to implement a split transaction bus is often not justified. Maintaining cache coherency further complicates the implementation of a split transaction bus architecture.

A seemingly simple approach to reduce bus latency would be to increase the clock speed of the bus controller. By increasing the clock speed, the time for memory access necessarily decreases. However, this is an expensive approach that may require use of emitter-collector logic ("ECL") or other expensive materials in order to achieve the required increase in clock speeds.

Another attempt at reducing bus latency is the implementation of loosely-coupled processors. This approach has limited benefits in applications which may share common data structures. The level of bus arbitration will increase in order to resolve the multiple contention problems associated with a shared resource. The time spent on bus arbitration will reduce the overall time saved with loosely-coupled processors. Therefore, for shared resources, the system complexity increases, with little or no bus bandwidth increase.

SUMMARY OF THE INVENTION

The present invention is an improved bus architecture system for use in a tightly-coupled multi-processor system with memory storage separated into separate memory modules. The design of the present invention makes use of unused bus time and does not introduce complexities into the system which reduce the overall bandwidth increase.

The improved bus architecture of the present invention utilizes memory mapping, wherein the memory is mapped across several separate memory boards. In addition, the system provides concurrent outstanding address requests on the bus if these requests are for accesses to memory locations located on separate memory modules. The present invention decreases bus latency when any equivalent bus requests involve accesses to data from separate memory modules.

The improved bus control system of the present invention is preferably utilized in a multi-processor system having at least two memory modules, and having a common address and data bus connecting the memory modules to the processor modules. A preferred embodiment of the improved bus control system includes means for determining a first slot identifier of a first one of the memory modules which contains a first data request and means for storing the first slot identifier. In addition, the bus control system includes means for determining a second slot identifier for a second memory address request and means for comparing the first slot identifier with the second slot identifier. Preferably, a static random access memory (SRAM) is used to determine the first and second slot identifiers, and a storage register is used to store the first slot identifier.

Desirably, a comparator is used to compare the first and second slot identifiers. If the first slot identifier differs from the second slot identifier, a means for issuing an early address request to the common bus is provided. Preferably, a simple logic circuit is used to issue an early address request to the common bus. Further, the preferred embodiment of the improved bus control system includes means for disabling the issuance of the early address request by any one of the processor modules if the feature is not desired.

DETAILED DESCRIPTION OF THE INVENTION

Figure 1:
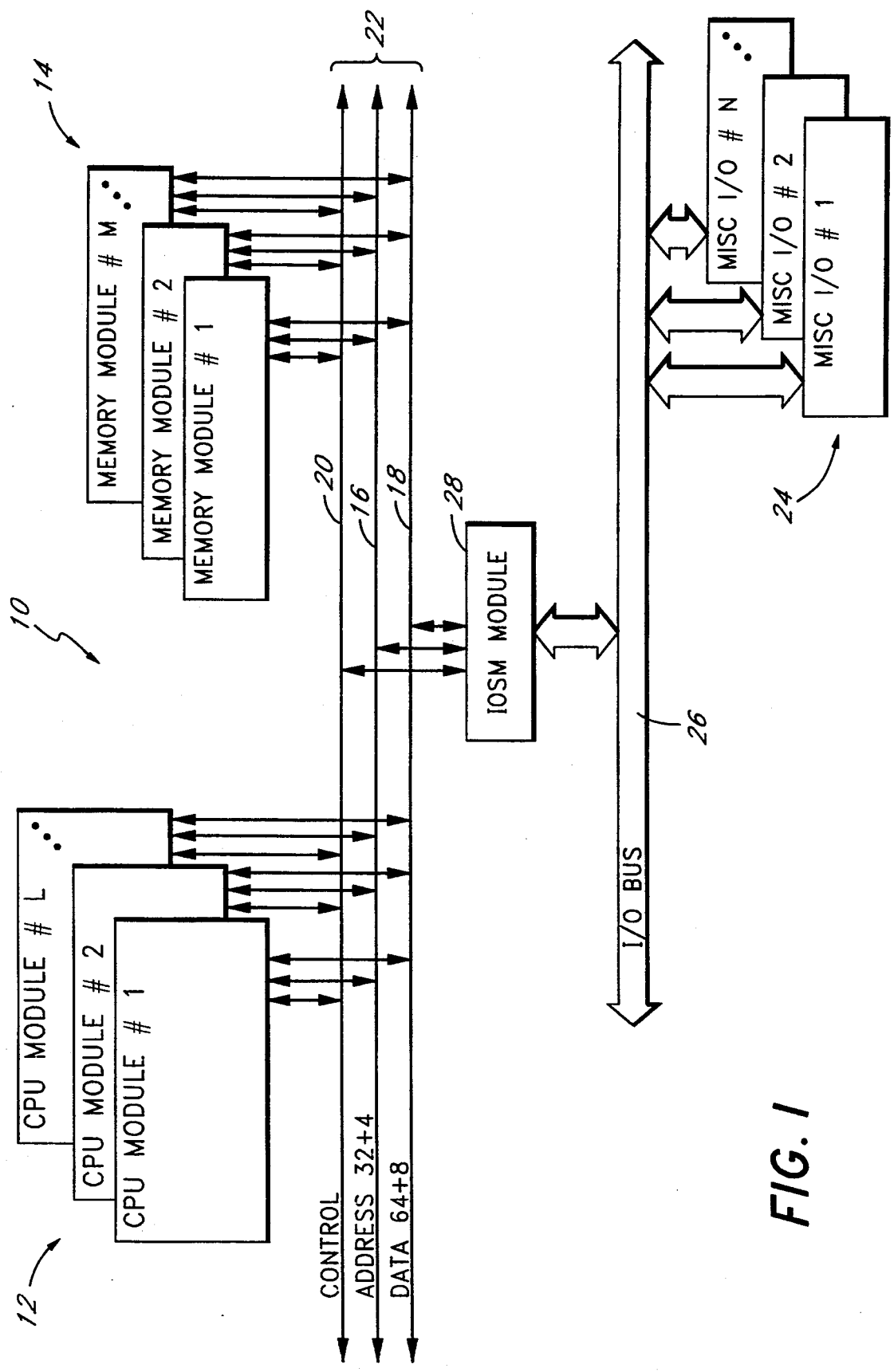
FIG. 1 is a system block diagram of a multi-processor system which implements the bus architecture of the present invention.

The present invention is an improved bus architecture system for use in a common-bus, multi-processor system 10 with shared memory (i.e., the processors have access to common memory and shared resources). FIG. 1 illustrates a conventional multi-processor system 10 which contains a number of CPU modules 12 (i.e., CPU MODULE #1, CPU MODULE #2, ... CPU MODULE #L) and a shared memory storage area containing a number of memory modules 14 (i.e., MEMORY MODULE #1, MEMORY MODULE #2, ... MEMORY MODULE #M). The CPU modules 12 and memory modules 14 are connected to a system address bus 16, a system data bus 18 and a system control bus 20 (collectively the "system bus" 22). The multi-processor system 10 may also include various I/O and peripheral modules (i.e., MISC I/O #1, MISC I/O #2...MISC I/O #N) 24 which are connected together along an I/O bus 26. A peripheral system controller or I/O service module (IOSM Module) 28 provides an interface between the system bus 22 and the I/O bus 26 to control the data flow between the peripheral devices 24 and the system bus 22.

In general, each memory module 14 comprises a plurality of random access memory (RAM) chips organized on a circuit board with accompanying decoder logic to read and decode the address requests. The storage capacity of each memory module 14 depends upon the number of RAM chips that are installed on the circuit board and the capacity of each RAM chip, as is well known in the art. Preferably, using standard memory mapping techniques, the system memory addresses are divided among the individual memory modules 14 based upon the memory capacity of each module 14. The memory map is generated on power-up by the system basic input/output system (BIOS). A preferred memory mapping technique for use with the bus bandwidth maximizer circuit of the present invention is described in more detail below.

Figure 2:
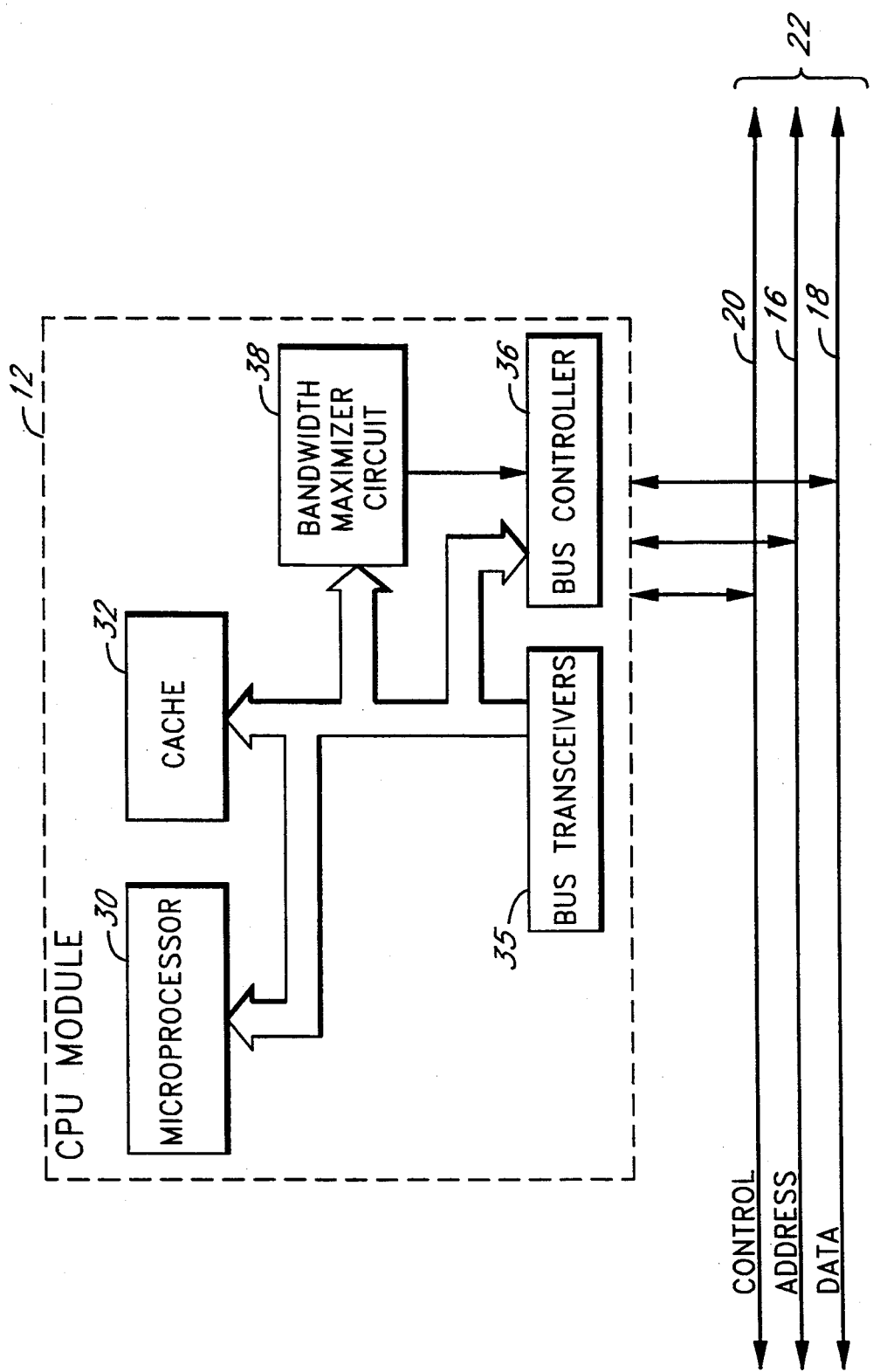
FIG. 2 is a block diagram representing an individual CPU module and its communication channels with the address and data bus.

FIG. 2 illustrates a block diagram of a typical CPU module 12 used in the multi-processor system 10 of FIG. 1. Preferably, the CPU module 12 comprises a microprocessor 30, a cache memory system ("CACHE") 32 with internal address decoder logic, a CPU or local processor bus 34, bus transceivers 35 and system bus controller logic 36. In accordance with the present invention, each CPU module 12 further has a bandwidth maximizer circuit 38.

In the present embodiment, the CPU modules 12 of the multi-processor system 10 utilize a typical snooping cache, as is well known in the art. When a data request is made, each cache 32 monitors the address to determine if the cache 32 contains the requested data. To allow the caches 32 to snoop each request, the bus transceivers 35 of each CPU module 12 read each address request from the system address bus 16. The address is transmitted via a local processor bus 34 to the cache 32 on the CPU module 12. If the cache 32 has the data for the requested address, a signal is sent to the system bus 22, commonly known as a snoop hit signal. When the system data bus 18 is available, the data is provided from the CPU cache 32 which detected a snoop hit to the data bus 18, as is well known in the art.

Figure 3:
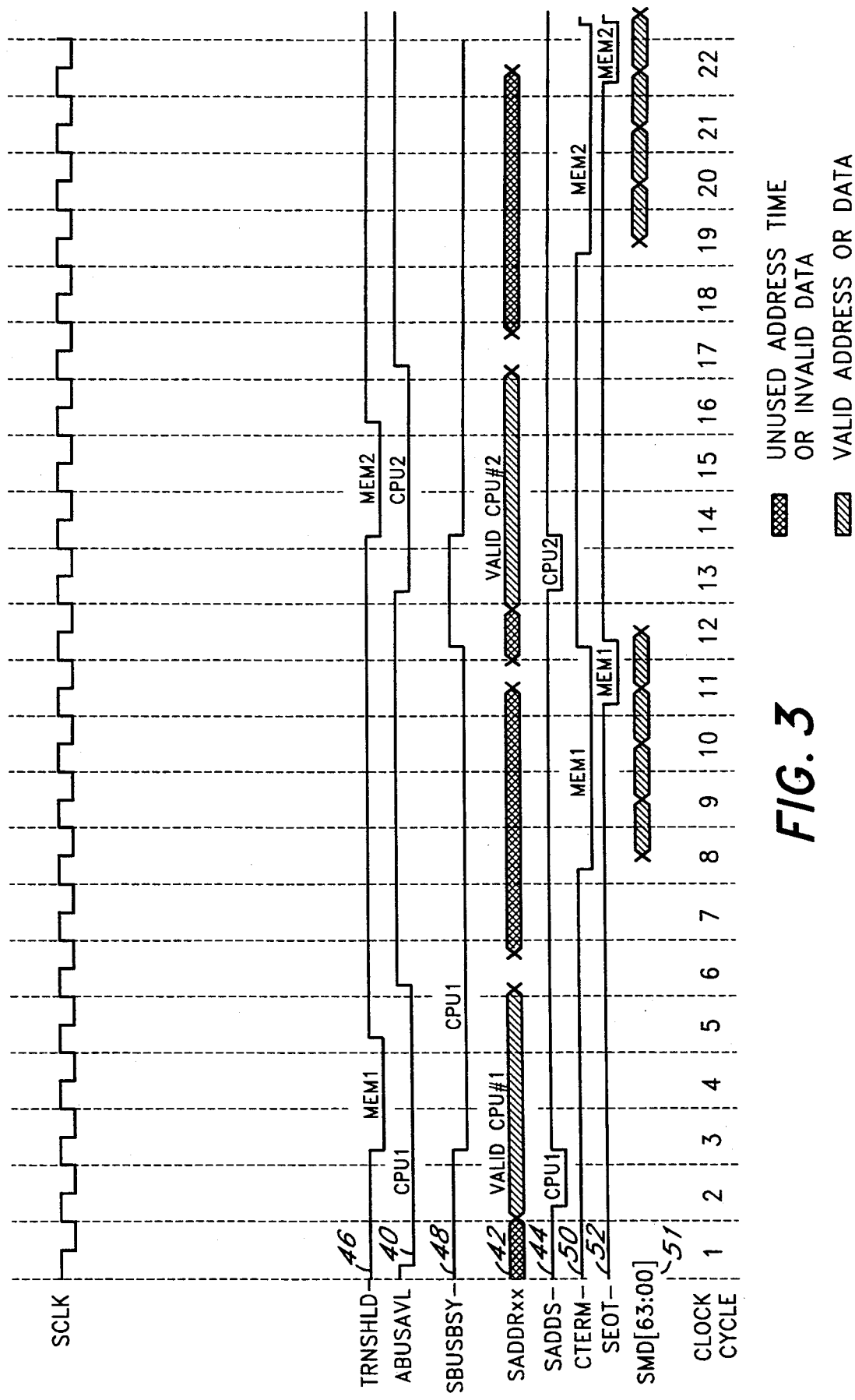
FIG. 3 is a timing diagram illustrating the normal read cycle for a snoop-miss data request on a multi-processor system without the bus architecture of the present invention.

FIG. 3 illustrates a read cycle of a CPU module 12 of a multi-processor system 10 for a memory cycle with a snoop miss (i.e., the requested data was not in a cache 32). A CPU1 initiates a BUSREQUEST signal (not shown) to a system bus arbitrator. When the system data bus 18 is available, the bus arbitrator returns a BUSGRANT signal (not shown) to the CPU1. The cycle timing of FIG. 3 begins after the BUSGRANT signal. As illustrated in FIG. 3, once the CPU1 receives the BUSGRANT signal, the CPU1 holds the system address bus 16 in a first clock cycle by driving the address bus available line (ABUSAVL) 40 low. Also during clock cycle 1, the system address from CPU1 is presented to the system address bus 16 via the SADDRxx lines 42. After the CPU1 has asserted the address on the system address bus 16, the CPU1 asserts the system address strobe, SADDS- line 44, in the second clock cycle. The address is valid from clock cycle 2 through clock cycle 5. The devices which latch the address do so in response to the signal of the SADDS- signal line 44. The memory modules 14 and the CPU caches 32 then determine if they contain the requested data. While each CPU cache 32 and memory module 14 determines if it has the requested data, each CPU module 12 and memory module 14 drives the transaction hold (TRNSHLD-) signal 46 low. In other words, initially, several devices may be driving the TRNSHLD- line 46 low. Therefore, until the last device releases the TRNSHLD- line 46, the line 46 remains low. The system bus busy line (SBUSBSY-) 48 is also driven low by the CPU1 to indicate that a cache 32 transfer is in process.

Each CPU cache 32 and memory module 14 releases the transaction hold, or TRNSHLD-, signal line 46 when it determines that it does not contain the requested data. Therefore, the read cycle remains on hold until all of the memory storage areas check for the requested data. The last device to release the TRNSHLD- signal 46 will be assumed to contain the requested data. In the example of FIG. 3, the TRNSHLD- signal 46 is held low from clock cycle 3 to clock cycle 5, and the last memory storage device to release the TRNSHLD- signal line 46 is, for purposes of this example, memory module 1.

After clock cycle 5, the system address bus 16 becomes available again. The signal ABUSAVL 40 returns high during clock cycle 6 in response to the release of the TRNSHLD- signal line 46.

In the present example, once the data is valid on the system data bus 18, the device providing the data, memory module 1 drives the CTERM- line 50 low during clock cycle 8. The valid data is presented to the system data bus 18 on lines SMD[63:00]51, and is valid from clock cycle 8 through clock cycle 11. At the end of the valid data on the system data bus 18, the SEOT- line 52 is strobed low at clock cycle 12, and the CTERM- line 50 returns to a normal high level. At clock cycle 12, the system address bus busy line, SBUSBSY- line 48, returns high, indicating availability of the system bus 22 for further requests. From the time the address is asserted on the system address bus 16 until the data is sent to the requesting CPU module 12, i.e., from clock cycle 3 to clock cycle 12, the system address bus busy line, SBUSBSY- line 48, is held low. During this time, all other CPU modules 12 are prevented from using the system bus 22.

For purposes of the present example, at clock cycle 13, CPU2 makes an address request by driving the ABUSAVL line 40 low, asserting the desired address on the system address lines, SADDRxx 42, and strobing the address bus request line, SADDS- 44.

In response to the address request of CPU2, during clock cycle 13, the CPU2 drives the ABUSAVL line 40 low, signalling that the system address bus 16 is busy with a new request. The read cycle repeats for the read request of CPU2.

As illustrated in FIG. 3, the system address bus 16 is not used from clock cycle 7 into clock cycle 11, yet the system address bus 16 is held "busy" as part of the system bus 22. This prevents another CPU module 12 from issuing a bus request and starting a new cycle. Similarly, during the interval from clock cycle 18 into clock cycle 22, the system address bus 16 is not in use. As described below, the bandwidth maximizer circuit 38 utilizes these unused intervals in a typical read cycle when the system address bus 16 is not in use but the read cycle has not been completed. In general, the bandwidth maximizer circuit 38 allows a second bus master device such as a CPU 12 to issue an early address request without interfering with an address request already in progress.

Figure 4:
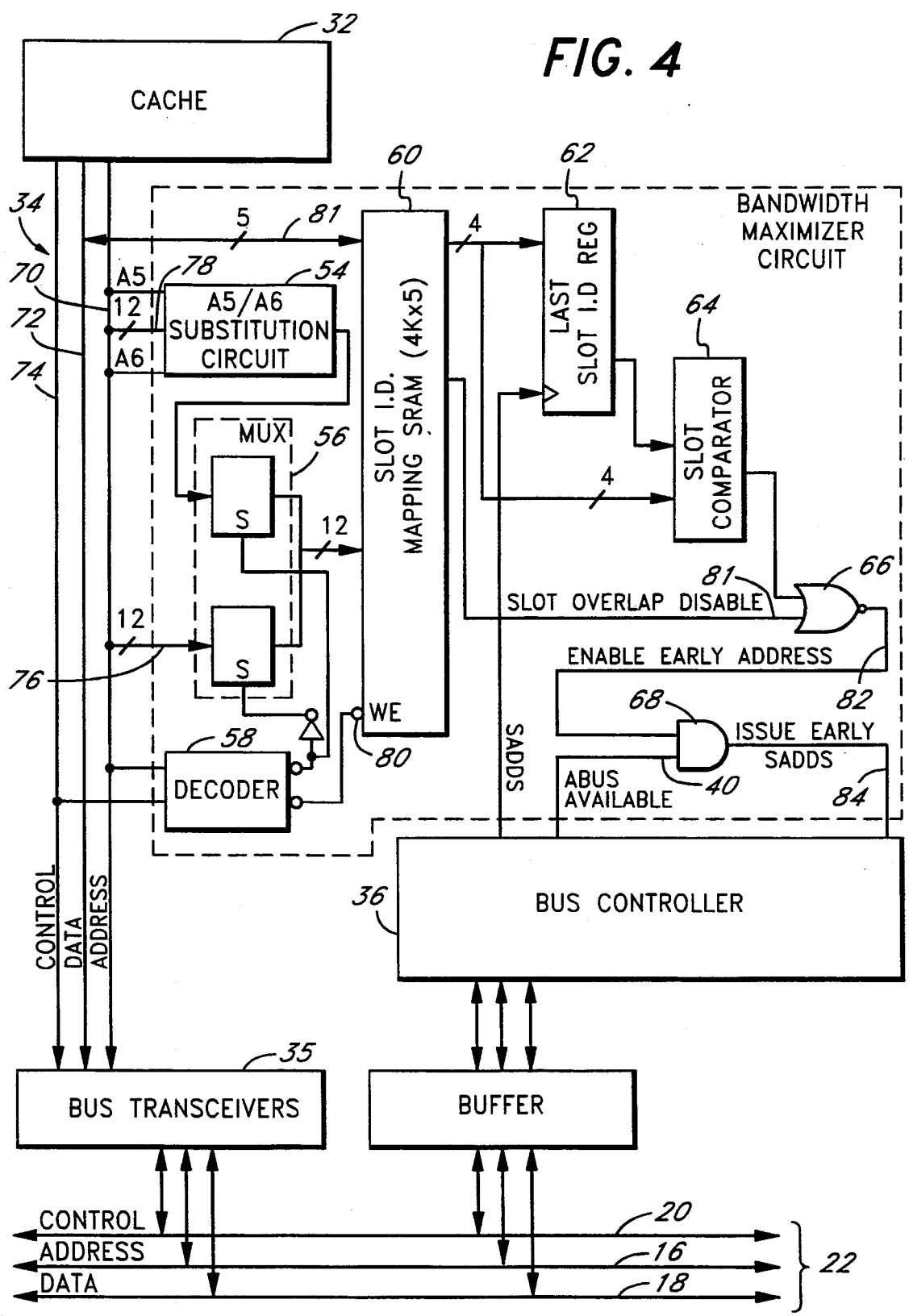
FIG. 4 is a block diagram of one embodiment of the circuitry to implement the bus architecture of the present invention.

FIG. 4 illustrates a block diagram of the bandwidth maximizer circuit 38 of the present invention. The preferred embodiment of the bandwidth maximizer circuit 38 comprises an A5/A6 address line substitution circuit 54, a multiplexer (MUX) 56, a memory mapped decoder 58, a slot I.D. mapping static random access memory 60, a Last Slot I.D. register 62, a Slot Comparator 64, a NOR gate 66 and an AND gate 68. The bandwidth maximizer circuit 38 is coupled to the local system bus 34 comprising a local address bus 70, the local data bus 72, the local control bus 74 and the bus controller 36 on the CPU module 12.

The slot I.D. mapping SRAM 60 is organized as 4,096 (4K) words by 5 bits per word. The slot I.D. mapping SRAM 60 stores the memory map information which is configured at power-up by the system bios. More particularly, the first four bits of each location in the slot I.D. mapping SRAM 60 store the slot number of the memory module 14 assigned to the address range in system memory mapped by each location in the slot I.D. mapping SRAM 60. The fifth bit of each location in the slot I.D. mapping SRAM 60 is assigned as a slot overlap disable flag for the memory range mapped by each location in the slot I.D. mapping SRAM 60. The bus controller 36 on the CPU module 12 controls the communications between each CPU module 12 and the system bus 22.

In the present embodiment, the MUX 56 either selects address lines A2–A13 76 or A20–A31 78 from the local address bus 70 and provides them to the slot I.D. mapping SRAM 60. The decoder 58 is responsive to write operations to the addresses assigned to the slot I.D. mapping SRAM 60 to activate an output connected to the MUX 56, and thereby cause the MUX 56 to select address lines A2–A13 76 for coupling to the outputs of the MUX 56. The outputs of the MUX 56 are coupled to the address inputs of the slot I.D. mapping SRAM 60. The decoder 58 is also responsive to the addresses assigned to the slot I.D. mapping SRAM 60 to enable an output connected to the write enable (WE) input 80 of the slot I.D. mapping SRAM 60. Therefore, when the decoder 58 detects that the address request is to an address assigned to the slot I.D. mapping SRAM 60, the decoder 58 connects address lines A2–A13 76 to the address inputs of the slot I.D. mapping SRAM 60, and simultaneously activates the write enable input 80 to the slot I.D. mapping SRAM 60, allowing the SRAM 60 contents to be altered by storing the least significant 5 bits of data from the local data bus 72 via a set of data input lines 81. Write and read operations to addresses other than the addresses assigned to the slot I.D. mapping SRAM 60 do not activate the output of the decoder 58. Accordingly, with write and read operations to addresses other than the addresses assigned to the SRAM 60, the MUX 56 selects address lines A20–A31 78 for coupling to its outputs, and in turn to the inputs to the slot I.D. mapping SRAM 60.

During initialization of the slot I.D. mapping SRAM 60, the computer operating system writes to the addresses assigned to the slot I.D. mapping SRAM 60. The decoder 58 selects address lines A2–A13 76 for connection to the address inputs of the slot I.D. mapping SRAM 60. In the present embodiment, the system memory is divided into blocks of 1 megabyte each. Thus, the slot numbers stored in each location of the slot I.D. mapping SRAM 60 are assigned on the basis of the 1-megabyte divisions of memory. For example, if the first megabyte of memory is mapped to a memory module 14 in slot 3 and the second megabyte of memory is mapped to a memory module 14 installed in slot 4, the computer operating system stores the identifier "3" (011 in binary) in the first location of the slot I.D. mapping SRAM 60, and the identifier "4" (100 in binary) in the second location of the slot I.D. mapping SRAM 60.

During accesses to addresses not assigned to the slot I.D. mapping SRAM locations, the decoder 58 selects address lines A20–A31 78 for transmission through the mux 56 for connection to the address inputs of the slot I.D. mapping SRAM 60. Because A20 becomes the least significant bit of the address inputs to the slot I.D. mapping SRAM 60, the address to the slot I.D. mapping SRAM 60 only increments with each megabyte increment.

In the present embodiment, the high throughput of the bandwidth maximizer circuit 38 is achieved as long as the sequential address requests are to different memory modules (slots). Hence, the benefits of the bandwidth maximizer circuit 38 are well achieved with at least two memory modules. However, even with two memory modules, if the modules are mapped linearly in the 1-megabyte segments, sequential accesses will need to be in different megabyte address ranges. Therefore, to increase the likelihood of accesses going to different modules, the memory is advantageously mapped so that sequential cache lines (32 bytes in the present embodiment) are fetched from different memory modules.

Figure 6:
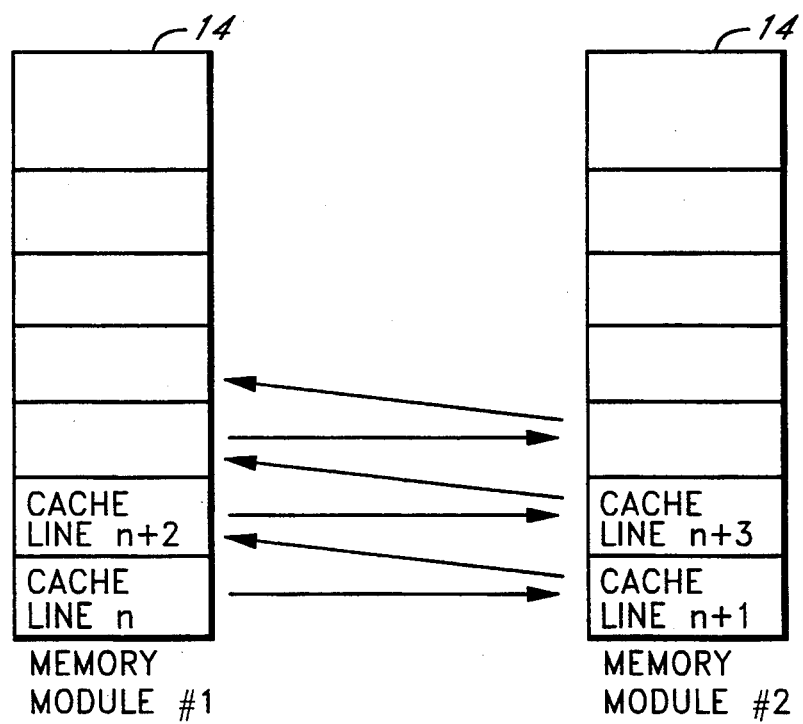
FIG. 6 illustrates an example of a preferred cache line interleaving scheme employed in a system memory.

This "interleaving" 60 is depicted in FIG. 6 below. In one embodiment, in order to realize this cache-line-based interleaving, address line A5 is exchanged with address line A20 such that each 32-byte cache line is interleaved between two memory modules 14. In a further embodiment, address line A6 is further exchanged with address line A21. This leads to each sequential 32-byte cache line being interleaved between four memory modules. An A5/A6 substitution circuit 54 performs this function. An embodiment of an A5/A6 substitution circuit 54 is depicted in detail in FIG. 7, and will be described in further below.

In a multi-processor computer system wherein each CPU module 12 has an associated snooping cache, as seen in FIG. 4, when a system bus cycle is initiated, all nonparticipating processors 30 monitor (snoop) the address to maintain cache coherency, as is well known in the art. In order to snoop the address, each processor 30 latches each address from the system address bus 16 onto the local address bus 70 for comparison by the cache 32. Therefore, with each address request on the system address bus 16, the same address is present on the local address bus 70 for each CPU module 12 or other bus master module with a snooping cache in the system. Each cache 32 then determines if it has the requested data, as is well known in the art.

The bandwidth maximizer circuit 38 utilizes each address while it is active on the local address bus 70. In general, each bandwidth maximizer circuit 38 stores the slot I.D. of each address request in the Last Slot I.D. register 62. Thus, after each address request, the Last Slot I.D. register 62 for each bandwidth maximizer circuit 38 contains the slot I.D. of the last address request. When a CPU module 12 initiates an address request, the initiating CPU 12 first places the address on its local address bus 70, and the bandwidth maximizer circuit 38 for that CPU 12 compares the slot I.D. for the new address with the slot I.D. of the last address. If the slot I.D. of the last request and the new request are to different slots, then the bandwidth maximizer circuit 38 for the requesting CPU issues an early address request during the period of the previous bus cycle in which the system address bus 16 is not used.

The determination of whether to issue an early address request is described in further detail with reference to the block diagram of FIG. 4 and the timing diagrams of FIG. 5. While each address to system memory is active and is latched onto the local address bus 70, the mux 56 couples address lines A20–A31 78 to the address inputs of the Slot I.D. Mapping SRAM 60. Accordingly, the address on the local address bus 70 indexes the Slot I.D. Mapping SRAM 60. The slot I.D. (i.e., slot number) of the memory module 14 corresponding to the address becomes active on four of the outputs to the SRAM 60. These four outputs are coupled to the Last Slot I.D. Register 62 and to the Slot Comparator 64.

The outputs of the Last Slot I.D. Register 62 are also coupled to the Slot Comparator 64. Until the current slot I.D. is clocked into the Last Slot I.D. Register 62, the outputs of the Last Slot I.D. Register 62 will contain signals representing the slot I.D. for the last address request. Therefore, before this clocking occurs, the Slot Comparator 64 compares the slot I.D. of the last address request to the slot I.D. of the current request.

The clock signal for the Last Slot register is the system address bus strobe, SADDS- line 44. The initiating CPU does not issue a strobe on the SADDS- signal line 44 until it enables the address on the system address bus 16. Therefore, until the initiating CPU issues a strobe on the SADDS- signal line 44, the slot I.D. of the present request will become available on the outputs of the Slot I.D. Mapping SRAM 60, and the outputs of the Last Slot I.D. register 62 will represent the slot I.D. of the previous address request on the system address bus 16. The comparator 64 compares these slot I.D.s for equality. After the comparison, the slot I.D. of the new address request will be clocked into the Last Slot I.D Register 62 for the next time when the initiating processor 30 strobes the SADDS- signal line 44. This timing is illustrated in the upper portion of FIG. 5.

The output of the Slot Comparator 64 is one input to the NOR gate 66. If the last and current slot I.D.s are not equal, then the Slot Comparator 64 will not activate its output. The other input to the NOR gate 66 is a Slot Overlap Disable signal line 81 which is the fifth output of the 5-bit wide Slot I.D. Mapping SRAM 60. As explained above, the fifth bit of each memory location in the SRAM 60 is a flag which can be set by the CPU to override (i.e., inhibit) the issuance of an early address request. For example, if a first CPU module 12 requests data directly from a second CPU module 12, it would not be advantageous to use the early address request function because the requested data is not found on one of the memory modules 14.

If the fifth bit of the current Slot I.D is not set, and the compare is not equal, then both inputs to the NOR gate 66 will be low. Thus, the NOR gate 66 will provide an active high output, which is an "Enable Early Address" signal line 82.

One further condition is also checked before an early address request is issued. The bandwidth maximizer circuit 38 determines whether the system address bus 16 is available. The availability of the system address bus 16 is indicated by the ABUSAVL signal line 40. The AND gate 68 having as inputs the ABUSAVL signal line 40 and the Enable Early Address signal line 82, determines whether the ABUSAVL signal line 40 is active while the Enable Early Address signal line 82 is active. If this condition exists, the output of the AND gate 68 (an Issue Early SADDS- signal line 84) becomes active to indicate to the bus controller 36 that an early SADDS- 44 may be issued by the issuing CPU module 14.

In other words, if the memory module 14 of the new request is different than the memory module 14 of the last request, if the early request has not been disabled, and if the system address bus 16 is available, the CPU bus controller 36 may issue an early address request for the new data while the system bus 22 is still busy completing the last request. If the memory module 14 of the new request is the same as the memory module 14 of the current request, the requesting CPU 12 is caused to wait until the current memory cycle is completed before issuing the SADDS- 44.

Figure 5:
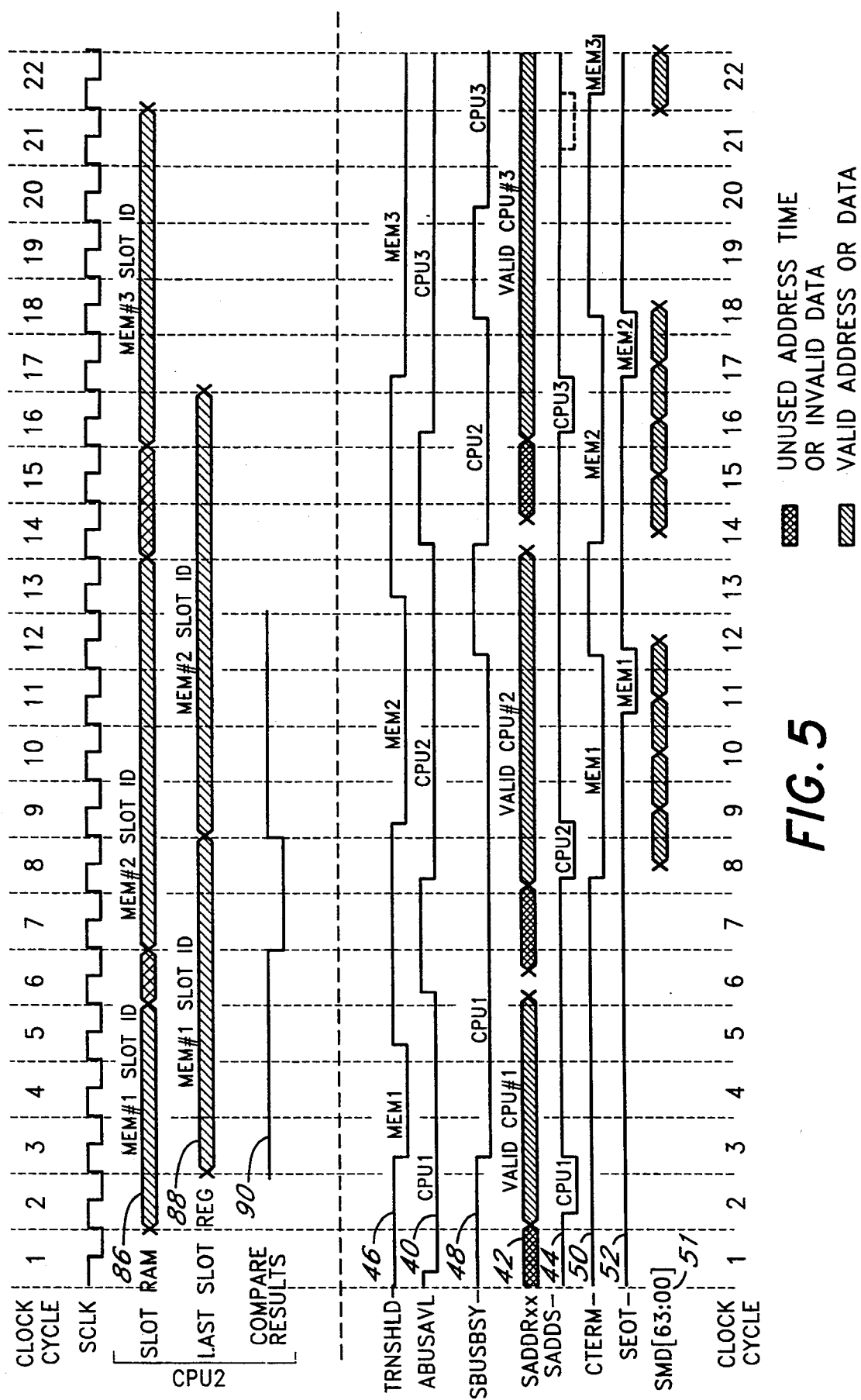
FIG. 5 is a timing diagram of the improved access time of a snoop-miss data request utilizing the bus architecture of the present invention.

FIG. 5 is a timing diagram of the system of the present invention for sequential snoop miss read operations, (i.e., the requested data is not located in any of the caches 32). This diagram illustrates the bandwidth increase which can occur by utilizing the bandwidth maximizer circuit 38 of the present invention.

The initial portion of the read cycle tracks the timing diagram of FIG. 3. In clock cycle 1, the CPU1 drives the ABUSAVL signal line 40 low, to indicate that the system address bus 16 is in use. At clock cycle 2, CPU1 enables the address onto the SADDRxx lines 42, and drives the system address bus line, SADDS- 44, low. After the SADDS- 44 strobe, CPU1 drives the system address bus busy line (SBUSBSY- line 48), low starting during clock cycle 3. From clock cycle 3 to clock cycle 5, the memory modules 14 and the CPU cache storage areas 32 check for the requested data and drive the transaction hold, TRNSHLD-, signal line 46 low. Each of the memory modules 14 and the CPU caches 32 release the TRNSHLD- signal line 46 as each determines that it does not have the requested data. However, as long as any single module is still driving the TRNSHLD- signal line 46 low, this line remains low. During clock cycle 5, all of the memory modules 14 have released the TRNSHLD- signal line 46. In this example, it is assumed that memory module 1 contains the requested data.

After the memory module 1 releases the TRNSHLD- signal line 46 during clock cycle 5, the CPU1 releases the ABUSAVL signal line 40 in clock cycle 6. This sequence indicates that the address on the system address bus 16 has been accepted and the address bus 16 is now available. However, the CPU1 continues to hold the SBUSBSY- signal line 48 active (low) until it receives the requested data. In the conventional systems described above, the system address bus 16 will remain unused until the cycle is complete. The bandwidth maximizer circuit 38 of the present invention provides for utilization of the system address bus 16 before the pending bus cycle is complete, as further described below.

The upper portion of the timing diagram of FIG. 5 illustrates the timing in the bandwidth maximizer circuit 38 of CPU2. The other CPUs in the system also track this timing. As illustrated in the upper portion of the timing diagram, during clock cycle 2, CPU2 (and all other CPU's in the system) determines that the slot I.D. of the address request is the slot number for memory module 1. This is illustrated in the Slot RAM line 86 of the timing diagram which symbolizes the data at the outputs of the Slot I.D. Mapping SRAM 60. Then, the SADDS- line 44 returning high clocks the slot I.D. of the memory module of the data request into the Last Slot I.D. register 62 on each CPU module 12. This is illustrated in the Last Slot Reg line 88 of the timing diagram.

For the purposes of this description, it is assumed that at clock cycle 7, CPU2 has an address request ready. Therefore, CPU2 places the address on its local address bus 70. This address (i.e., the portion on address lines A20–A31) indexes the Slot I.D. Mapping SRAM 60 of the bandwidth maximizer circuit 38 for the CPU2. The four outputs of the Slot I.D. Mapping SRAM 60 for the CPU2 become active with the slot I.D. of the memory module 14 for the address request of the CPU2. The outputs of the Last Slot I.D. Register 62 are still active with the slot I.D. for the last address request by the CPU1. The comparator 64 compares the new slot I.D. with the last slot I.D. at clock cycle 7 to determine if the new address request from CPU2 is from the same memory module 14 as the last address request from CPU1. Assuming for this description that the address request by CPU2 is to the memory module 2, which is in a different slot than the memory module 1, then the comparator 64 does not detect equality. This is represented in the Compare Results line 90 which is an active high signal when the two inputs to the comparator 64 are equal and is located on the upper portion of the timing diagram of FIG. 5. The timing diagram indicates the Compare Results line 90 will be inactive or low during clock cycles 7 and 8 as the two address requests are located on different memory modules 14.

During clock cycle 7, the bandwidth maximizer circuit 38 also determines that the slot overlap disable bit has not been set with the NOR gate 66. For purposes of this description, it is assumed that the slot overlap disable bit stored in the fifth bit of the location in the Slot I.D. Mapping SRAM 60 corresponding to the address request of CPU2 is not set. Accordingly, the output of the NOR gate 66 becomes high. With the AND gate 68, the bandwidth maximizer circuit 38 for the CPU2 determines if the system address bus 16 is available (i.e., whether the ABUSAVL signal line 40 is high). The ABUSAVL signal line 40 in the lower portion of FIG. 5 indicates that the ABUSAVL line 40 is high during clock cycle 7. Therefore, the output of the AND gate 68 becomes high. This indicates to the bus controller 36 for the CPU2 that it may place the address for the request of CPU2 on the system address bus 16 and issue a system address strobe.

In addition, once it is determined that the address request is for a different memory module 14 and the system address bus 16 is available, the CPU2 drives the ABUSAVL line 40 low to take control of the system address bus 16. During clock cycle 8, the bus controller 36 for the CPU2 enables the new address onto the system address bus, SADDRxx lines 42, and strobes the SADDS- signal line 44 to indicate that the address is valid.

As explained above, each cache 32 and each memory module 14 latch the address on the system address bus 16 and use this address to maintain cache coherency and to index the Slot I.D. Mapping SRAM 60. The strobe on the SADDS- line 44 latches the four outputs of the Slot I.D. Mapping SRAM 60 into the Last Slot I.D. Register 62. This is represented in the Last Slot Reg line 88 of the upper portion of FIG. 5. At clock cycle 9, while the SADDS- line 44 is active, the slot I.D. for memory module 2 is latched into the Last Slot I.D. Register 62.

Also at clock cycle 8, the requested data from the read request from the CPU1 to memory module 1 is available, and the memory module signals this availability by driving the cycle terminate, CTERM-, signal line 50 low. CPU1 then accepts the valid data from lines SMD[63:00]51 at the rising edge of clock cycles 8–11. The address request from CPU2 is simultaneously being processed.

When the CPU1 has accepted the data transfer, the CPU1 drives the CTERM- line 50 high, and the system end of transaction SEOT- signal line 52 is strobed low. Once both of these signals have occurred at clock cycle 12, the SBUSBSY- signal line 48 returns high because the read cycle for CPU1 is complete.

Partially overlapping the data transfer, during clock cycles 9-13, the memory modules 14 and CPU cache memory storage areas 32 determine if they contain the requested data for the second address request from the CPU2. While the memory modules 14 and cache memory storage areas 32 make this determination, they each drive the TRNSHLD- signal line 46 low. As explained above, it was assumed for the present description that the memory module 2 contains the data for address request of the CPU2. During clock cycle 13, the transaction hold line, TRNSHLD- 46, returns high to signal that a memory module 14 has the data requested by CPU2.

At clock cycle 14, the memory module 2 drives the CTERM- signal line 50 low and enables the valid data on the data bus lines SMD[63:00]51. Simultaneously, the ABUSAVL line 40 returns high as the address of memory module 2 is no longer needed, and the SBUSBSY- line 48 will be pulled low to signal that the system data bus 18 will now be busy transmitting the data to CPU2. During clock cycles 14 through 17, the requested data from memory module 2 is available in the system data bus 18 at signal lines SMD[63:00]51, the CPU2 accepts the data and completes the second read cycle.

After clock cycle 14, the system address bus 16 is available for another early data access, and if a new address request is for data stored on a different memory module 14 than the current memory module 14 (i.e., memory module 2), that request may proceed. For instance, if the CPU3 (or CPU1) now requests data from memory module 1 or memory module 3, at clock cycle 16, the CPU3 initiates a new memory address request for the new address, and the read cycle is once again initiated.

Accordingly, if sequential memory requests are issued by different bus masters to different memory modules 14, the bandwidth maximizer circuit 38 provides for the early issuance of an address request before the system bus read cycle for the previous request has completed. Providing for this early address request can provide an increase of over 50% in usable system bus bandwidth.

As explained above, in order to better utilize the features of the bandwidth maximizer circuit 38 of the present invention, sequential cache lines are preferably mapped to different memory modules 14 to increase the chances that two sequential memory accesses are for memory locations on different memory modules 14.

FIG. 6 illustrates the interleaving of cache lines between two memory modules 14. The lines are interleaved such that cache line n and all even additions to cache line n, i.e., n, n+2, n+4, etc., are located on the same memory module, and all odd additions to cache line n, i.e., n+1, n+3, n+5, etc., all appear on the second memory module. Thus, sequential memory addresses, i.e., n and n+1, or n+1 and n+2, appear on different memory modules 14.

If there are two memory modules 14 as in FIG. 6, preferably, one memory line is interleaved, which increases the chances that sequential accesses will occur on different boards to 50% per board. If there are four memory modules 14, preferably, two memory lines are interleaved, which increases the chances that sequential accesses will occur on different boards.

Figure 7:
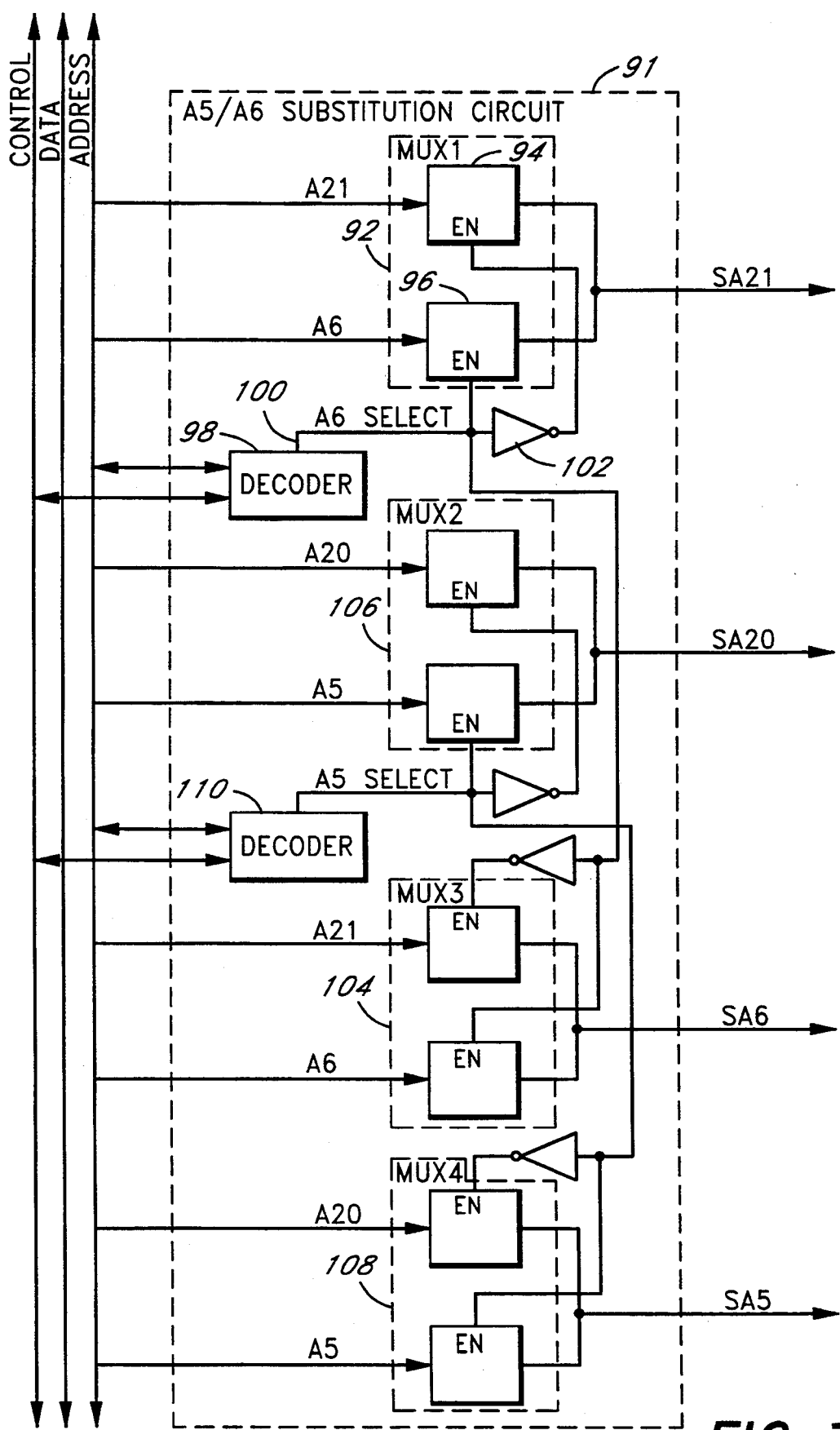
FIG. 7 is a block diagram of an address line exchange circuit according to the present invention.

To realize this function, the memory addresses are preferably interleaved by substituting at least one lower order address line with a higher order address line. FIG. 7 illustrates an example of a circuit which implements the substitution of two lower order bits, A5 and A6, with two higher order bits, A20 and A21. This circuit is advantageous for a system with at least four memory modules 14. For a system with two memory modules 14, the address line substitution circuit advantageously substitutes address line A5 with address line A20.

A first embodiment 54 of the A5/A6 substitution circuit that is required in FIG. 4 is a slightly simpler embodiment, as it only requires two multiplexers, and will therefore be described last. A second embodiment of the A5/A6 substitution circuit 91 is illustrated in FIG. 7 has four substitution multiplexers and is described below.

A first multiplexer 92 which comprises two enable gates or latches 94, 96 and a first memory mapped decoder 98 (which is shared by another multiplexer), the output of which is directly connected to the enable input of the first latch 94 and connected to the enable input of the second latch 96 through an inverter 100. The remaining three multiplexers comprise a similar configuration.

As illustrated in FIG. 7, the input to the first latch 94 in the first multiplexer 92 is the system address bus line A21, and the input to the second latch 96 in the first multiplexer 92 is the system address line A6. The output of each latch is connected to the RAM address or memory address input line SA21 of the memory storage area. The first memory mapped decoder 98 is connected to the system address bus 16 and the system control bus 18. The first memory mapped decoder 98 responds to a write operation to a predetermined address which has been assigned to the first decoder 98 to activate its output on an A6 select signal line 100.

The A6 select signal line 100 is connected to the enable input of the second latch 96 which has the address line A6 as an input, and is connected through an inverter 102 to the enable input of the first latch 94 which has the address line A21 as an input. Accordingly, when the A6 select signal line 100 becomes active, it selects the address line A6 for propagation through the latch and transmission to the SA21 address line of the memory storage area. In this manner, the A6 address line from the system address bus 16 is substituted for the A21 address line. The A6 select signal line 100 becomes active when the first decoder 98 detects a write operation to a predetermined address. The first decoder 98 is also responsive to a second predetermined address to deactivate the A6 select line 100.

The first multiplexer 92 which substitutes the A21 line for the RAM address input SA6 is controlled via the same decoder 98 as the third multiplexer 104 which substitutes the A6 address line for the memory input SA21. The remaining two multiplexers 106, 108 operate in a similar manner, but substitute address line A5 for address line A20, and address line A20 for address line A5, as controlled by the second decoder 110. The second decoder 110 responds to first and second predetermined addresses to either select substitution or allow normal transmission. By providing substitution of only the A5/A20 combination, each subsequent 32-byte cache line will be mapped alternatively between two memory modules 14. By substituting both the A5/A20 and A6/A21 address lines, each subsequent 32-byte cache line is interleaved between four memory modules 14.

The first embodiment of the A5/A6 substitution circuit 54 only requires two multiplexers. When each cache line is interleaved, the address line substitutions are also provided to the upper address lines, A20–A31 78 in the present invention, of the multiplexer 56 in the bandwidth maximizer circuit 38 for each CPU module 12. However, since the lower address lines, A0–A19 are not used by the bandwidth maximizer circuit 38 during system memory accesses in the embodiment described above, address lines A21 and A20 need not be substituted for address lines A5 and A6. Thus, the first embodiment of the A5/A6 substitution circuit 54 for each bandwidth maximizer circuit 38 can be simplified by only providing two multiplexers to substitute address lines A5 and A6 for address lines A20 and A21, respectively. Therefore the first embodiment of the A5/A6 substitution circuit 54 only requires the first multiplexer 92, the second multiplexer 106, the two decoders 98 and 110 and their respective connections, as illustrated in FIG. 7, to achieve the outputs SA20 and SA21.

Figure 8:
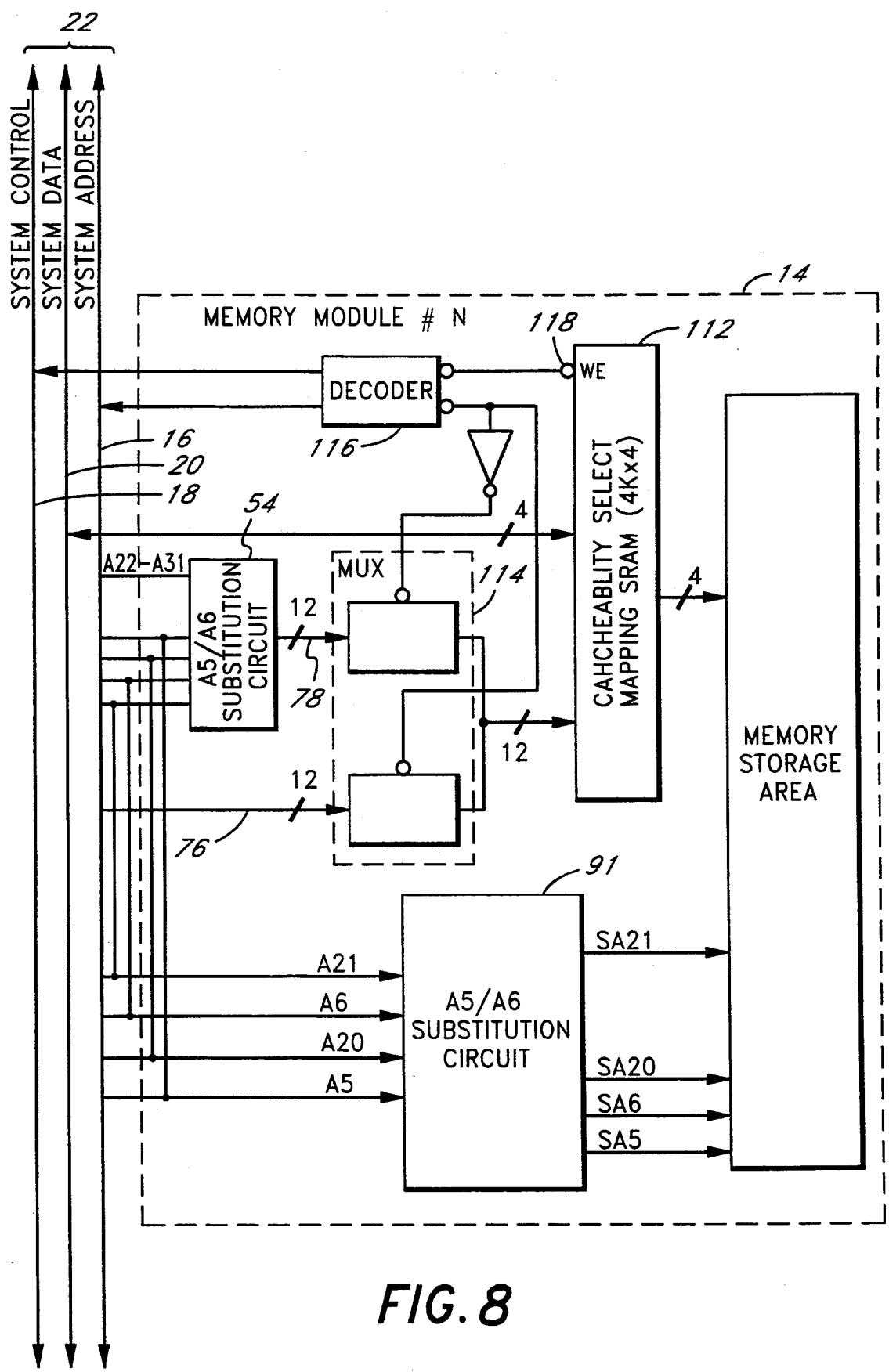
FIG. 8 is a block diagram illustrating a memory addressing circuit to realize an interleaved memory mapping technique.

FIG. 8 illustrates a block diagram of a preferred memory scheme for the multi-processor system 10 which is installed on the memory modules 14 of the system. Using standard memory mapping techniques, the memory storage area would typically be mapped into fairly large blocks of data (e.g., 1 megabyte in the embodiment described above). Thus, the lower memory address lines A0–A19 need not be used to determine which memory module 14 is addressed by an address request.

The cacheability/select mapping SRAM 112 comprises 4-bit wide memory locations. In the present embodiment, three of the four bits are utilized for cacheability control. For each memory division or block of addresses (i.e., 1-megabyte address blocks in the present embodiment), that memory block is designated to have certain features with respect to the cache 32. These features include whether or not the locations are designated as cacheable memory locations, whether or not they are write-through locations, and whether or not they are memory-read-only locations. Therefore, three of the four bits in each memory location of the cacheability/select mapping SRAM 112 are utilized to store flags as to these three attributes of each block of memory. The fourth bit indicates whether the block of memory indexed by the location in which the bit is stored is located on the corresponding memory module 14. In other words, if the cacheability/select mapping SRAM 112 is located on a memory module 14 in slot 2, and the first megabyte of memory is mapped to the memory module 14 on slot 2, the fourth bit of the first location of the cacheability/select mapping SRAM 112 for the memory module 14 in slot 2 will be set to indicate that block of memory addresses is assigned to the corresponding memory module 14. The fourth bit is advantageously connected to the memory select line of the memory storage area for the corresponding memory module 14.

Further, the cacheability/select mapping SRAM 112 has 12 address inputs in the present embodiment, which are sufficient to index the 4K of memory locations of the cacheability/select mapping SRAM 112. As with the slot I.D. mapping SRAM 60, the selection of which 12 lines are coupled to the cacheability/select mapping SRAM 112, is controlled via a multiplexer (MUX) 114. The alternate inputs to the MUX 114 are address lines A2–A14 and address lines A20–A31 78. The MUX 114 selects either address lines A2–A14 or address lines A20–A31 78 for coupling to the input of the cacheability/select mapping SRAM 112.

A memory mapped decoder 116 responds to addresses assigned to the cacheability/select mapping SRAM 112 during initialization of the cacheability/select mapping SRAM 112 in order to select address lines A2–A14 for coupling to the SRAM 112. The decoder 116 also activates an output connected to the write enable input (WE) 118 of the cacheability/select mapping SRAM 112 when the decoder 116 detects addresses assigned to the SRAM 112. Accordingly, during system initialization of the cacheability/select mapping SRAM 112, address lines A2–A14 are coupled to the SRAM 112, and the data representing the cacheability concerns and the memory map for the corresponding memory modules 14 are stored in the SRAM 112.

During operation, the decoder 116 detects that the address requests are to system memory address locations and selects address lines A20–A31 78 for coupling through the MUX 114 to the cacheability/select mapping SRAM 112. In this manner, as explained above, the cacheability/select mapping SRAM 112 is indexed by address lines A20–A31 78, which results in an increment to the address of the SRAM 112 with each subsequent increment in 1-megabyte memory blocks. When interleaving is utilized by substitution of A5 and possibly A6, the first embodiment of the A5/A6 substitution circuit 54 substitutes A5 for address line A20, and A6 for address line A21 for inputs to the MUX 114 and the second embodiment of the A5/A6 substitution circuit 91 is used to substitute the addresses lines which go to the memory storage area. Accordingly, sequential 32-byte cache lines are fetched from different memory modules 14.

In another preferred embodiment, the memory is divided into increments of 8-megabyte memory blocks. The 8-megabyte memory block increment is preferred when 8-megabyte SIMMS are used on the memory modules 14. When the 8-megabyte memory blocks increments are used, the interleaved address lines are changed from A21 and A20 to A24 and A23, respectively.

The system of the present invention is advantageous over other bus systems as it enables a second CPU module 12 to begin a memory access before a first CPU module 12 has completed a memory request when the requests from the two CPU modules 12 access different memory modules 14. The typical system bus 22 for a multi-processor system 10 has a large span of unused bus time while the current CPU 12 is holding the system bus 22 to prevent another CPU 12 from beginning a request. The bandwidth maximizer circuit 38 of the present invention takes advantage of the unused time. As long as the new address request is for a different memory module 14 than the previous request, a new request can be initiated prior to completion of the previous cycle. This elegant control system can increase bus bandwidth by over 50% if sequential memory requests are on different memory modules 14, and if the request is a cache snoop miss.

In addition, using the preferred memory interleaving, the chances of sequential memory requests accessing different memory modules 14 is greatly increased, which improves the overall system performance by decreasing bus latency.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An improved bus control system for a multi-processor system, said multi-processor system having at least two memory modules, at least two processor modules, a common address bus and a common data bus connecting the memory modules to the processor modules, said control system comprising:
a bus control circuit on each of said processor modules, said bus control circuit further comprising:
a slot identification mapping circuit that determines a first slot identifier of a first one of the memory modules which contains a first address having data requested by a first data request and that determines a second slot identifier of a second one of the memory modules which contains a second address having data requested by a second data request;
a storage register that stores the first slot identifier;
a comparator that compares the first slot identifier with the second slot identifier; and
a first logic circuit that issues an early address request to the common address bus, if the first slot identifier differs from said second slot identifier.

2. A bus control system for a multi-processor system, said multi-processor system having multiple processor modules, at least two memory modules, a common address and a common data bus connecting the memory modules to the processor modules, said control system comprising:
a slot identification mapping circuit that determines a first slot identifier of a first one of the memory modules which contains a first address having data requested by a first data request and that determines a second slot identifier of a second one of the memory modules which contains a second address having data requested by a second data request;
a storage register that stores the first slot identifier;
a comparator that compares the first slot identifier with the second slot identifier;
a first logic circuit that issues an early address request to said common address bus if the first slot identifier differs from said second slot identifier; and
a second logic circuit that disables the issuance of the early address request by any one of the processor modules.

3. A method of improving the bus latency of a multi-processor system wherein multiple processors share a common address bus, a common data bus and a common control bus to multiple shared resources, said method comprising the steps of:
providing a first address on said common address bus;
determining in association with each processor that said first address is directed to a first shared resource;
initiating an access to said first shared resource;
generating a second address at a requesting processor prior to completion of said access to said first shared resource;
determining in association with said requesting processor that said second address is directed to a second shared resource different from said first shared resource, said step of determining that said second address is directed to a second shared resource different from said first shared resource further comprising the steps of:
determining a first resource identification from said first address;
saving said first resource identification;
determining a second resource identification from said second address;
comparing said second resource identification with said first resource identification; and
outputting a signal indicating that said second shared resource is different from said first shared resource when said second resource identification is different from said first resource identification; and initiating an access to said second shared resource prior to completion of said access to said first shared resource.

4. An improved multi-processor system comprising:
at least two memory modules;
at least two processor modules, each of said processor modules comprising a local address bus, a local data bus, and a local control bus; and
a common address bus, a common data bus and a common control bus connecting the memory modules to the processor modules,
each of said processor modules further comprising:
a static random access memory with first and second data input ports and a data output port, wherein said first data input port is connected to said local address bus and said second data input port is connected to said local data bus;
a storage register with an input port and an output port, said input port connected to said data output port of said static random access memory;
a comparator with first and second input ports and an output, wherein said first input port of said comparator is connected to said output port of said static random access memory and said second input port of said comparator is connected to said output port of said storage register;
a first gate with first and second inputs and an output, wherein said first input of said first gate is connected to said output of said comparator and said second input of said first gate is connected to said output port of said static random access memory; and
a second gate with first and second inputs and an output, wherein said first input of said second gate is connected to said output of said first gate, said second input of said second gate is connected to a first control signal provided by said common control bus to indicate the availability of said common address bus and said output of said second gate is a second control signal which is sent to said common control bus to indicate that an early address request can be sent to said common address bus.

5. An improved multi-processor system comprising:
at least two memory modules;
at least two processor modules, each of said processor modules comprising a local address bus, a local data bus, and a local control bus; and a common address bus, a common data bus and a common control bus connecting the memory modules to the processor modules, each of said processor modules further comprising:

a static random access memory with first and second data input ports and a data output port, wherein said first data input port is connected to said local address bus and said second data input port is connected to said local data bus;

a storage register with an input port and an output port, said input port connected to said data output port of said static random access memory, wherein said output port of said static random access memory is divided into a first set and a second set of data bits, wherein said first set of data bits indicates the memory module which contains data that is addressed by the local address bus and wherein said second set of bits indicates if an early address request is desired;

a comparator with first and second input ports and an output, wherein said first input port of said comparator is connected to said output port of said static random access memory and said second input port of said comparator is connected to said output port of said storage register;.

a first gate with first and second inputs and an output, wherein said first input of said first gate is connected to said output of said comparator and said second input of said first gate is connected to said output port of said static random access memory; and a second gate with first and second inputs and an output, wherein said first input of said second gate is connected to said output of said first gate, said second input of said second gate is connected to a first control signal provided by said common control bus to indicate the availability of said common address bus and said output of said second gate is a second control signal which is sent to said common control bus to indicate that an early address request can be sent to said common address bus.

6. A bus control system for a computer system having multiple CPU modules and multiple shared resources, said control system comprising:

a shared bus for communicating address, data and control signals between said CPU modules and said shared resources;

a bus controller on each of said CPU modules for initiating accesses to said shared resources in response to addresses from said CPU modules, said bus controller comprising:

a decoder for decoding identifications of shared resources being addressed by addresses on said shared bus;

a storage device for storing a first identification of a first shared resource for which an access is in progress; and a comparator for comparing said first identification with a second identification of a second shared resource for which an access is requested, said comparator providing an active output signal when said first identification and said second identification are different, said bus controller initiating an access to said second shared resource prior to completion of said access in progress in response to said active output signal.

7. A bus control system for a computer system having multiple CPU modules and multiple shared resources, said control system comprising:

a shared bus for communicating address, data and control signals between said CPU modules and said shared resources;

a bus controller on each of said CPU modules and said shared bus for initiating accesses to said shared resources in response to addresses from said CPU modules, said bus controller comprising:

a decoder for decoding identifications of shared resources being addressed by addresses on said shared bus, wherein said decoder comprises a memory which maps an address from said shared bus to an identification of a shared resource uniquely associated with said address;

a storage device for storing a first identification of a first shared resource for which an access is in progress; and a comparator for comparing said first identification with a second identification of a second shared resource for which an access is requested, said comparator providing an active output signal when said first identification and said second identification are different, said bus controller initiating an access to said second shared resource prior to completion of said access in progress in response to said active output signal.

* * * * *